H. B. KEIPER.
ANTIFRICTION BEARING.
APPLICATION FILED AUG. 8, 1910.

997,921.

Patented July 11, 1911.

2 SHEETS—SHEET 1.

Witnesses
Joseph B. Stack.
Elsie V. Webster.

Inventor
Henry B. Keiper
By Dowell and Dowell
his Attorneys

H. B. KEIPER.
ANTIFRICTION BEARING.
APPLICATION FILED AUG. 8, 1910.

997,921.

Patented July 11, 1911.
2 SHEETS—SHEET 2.

Witnesses
Joseph B. Stack
Elsie V. Webster

Inventor
Henry B. Keiper
By Dowell & Dowell
his Attorneys

UNITED STATES PATENT OFFICE.

HENRY B. KEIPER, OF LANCASTER, PENNSYLVANIA.

ANTIFRICTION-BEARING.

997,921.

Specification of Letters Patent. Patented July 11, 1911.

Application filed August 8, 1910. Serial No. 576,159.

*To all whom it may concern:*

Be it known that I, HENRY B. KEIPER, a citizen of the United States, residing at Lancaster, in the county of Lancaster and State of Pennsylvania, have invented certain new and useful Improvements in Antifriction-Bearings, of which the following is a specification.

This invention relates to anti-friction bearings, and more particularly to that class of bearings in which concentric rings or cylindrical bearing members are used with balls or rollers between the rings arranged in circular series for sustaining pressure and reducing friction.

The primary object of the invention is to provide an improved annular ball and roller bearing in which the cylindrical bearing members or rings have their bearing surfaces inclined or tapered and converging toward one side thereof, together with balls and conical rollers arranged in circular series between said rings and practically filling the annular conical space therebetween in such manner as to distribute the pressure between the rollers and balls over almost the entire bearing surface, the device being adapted to sustain both radial pressure and end thrust, and possessing great strength and efficiency and durability in practical use.

Further objects are to provide a device of the character referred to in which the several parts are assembled in compact form and held together so as to be capable of being handled as a unit, without liability of permitting any of the balls or rollers to drop out when the device is removed from the bearings or place of use, the balls carrying a part of the load and at the same time separating the rollers, and being likewise kept apart by the rollers, so that "spacers" or "separators" which are liable to injure the bearing are dispensed with.

The invention will first be hereinafter more particularly described, with reference to the accompanying drawings, which are to be taken as a part of this specification, and then pointed out in the claims at the end of the description.

Figure 1:
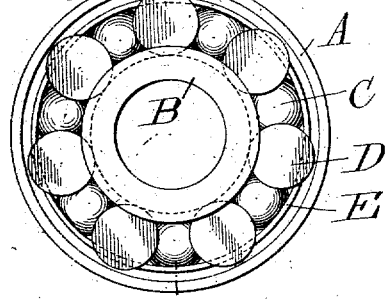
Figure 2:
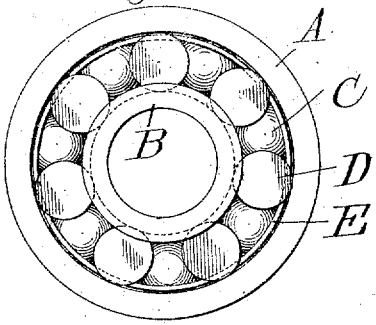
Figure 3:
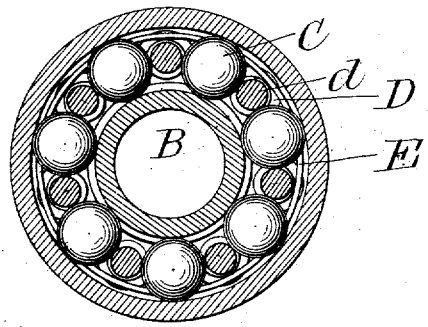
Figure 4:
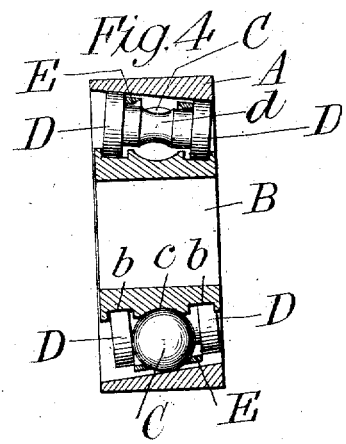
Figure 5:
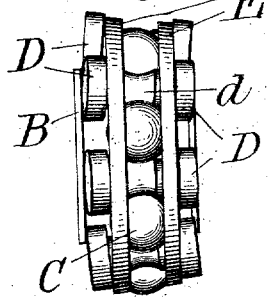
Figure 6:
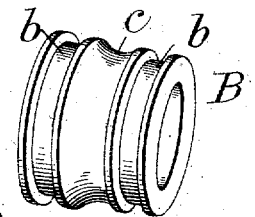
Figure 7:
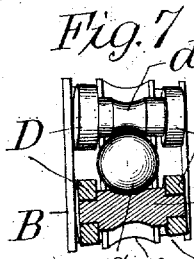
Figure 8:
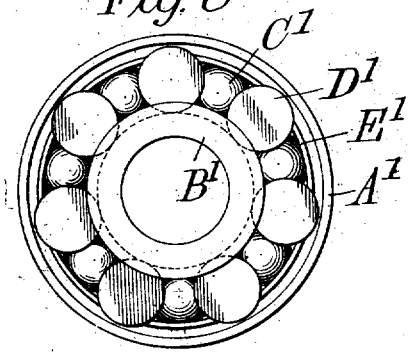
Figure 9:
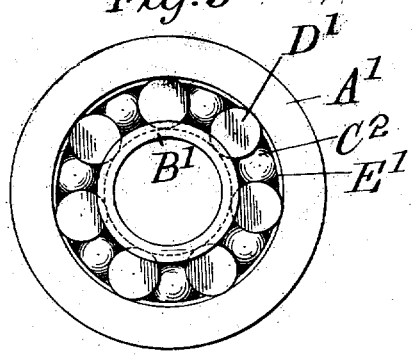
Figure 10:
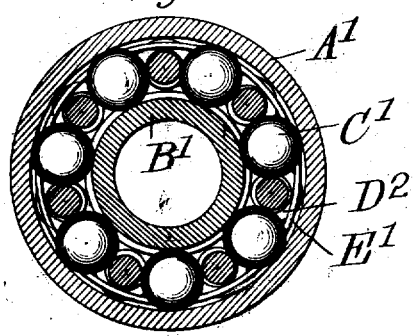
Figure 11:
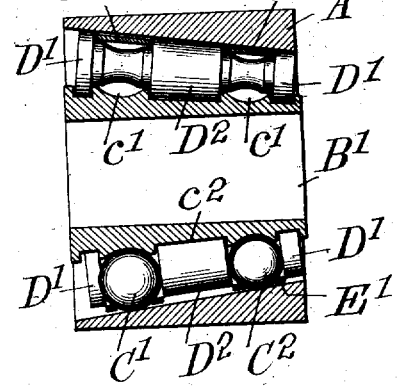
Figure 12:
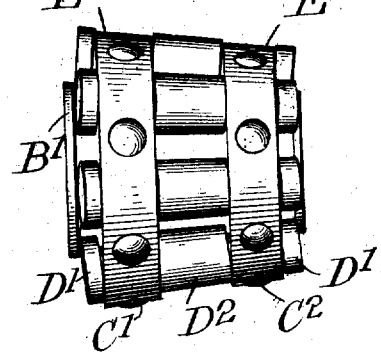
Figure 13:
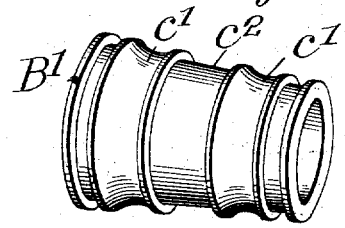

Figure 1 of the drawings represents a side elevation of an annular ball and roller bearing embodying my invention; Fig. 2 is a similar view looking at the opposite side; Fig. 3 is a vertical sectional elevation of said bearing; Fig. 4 is a vertical transverse section of the same taken on the line 4—4 of Fig. 1; Fig. 5 is a plan view of the cone with assembled rollers and balls removed from the outer ring or bearing member; Fig. 6 is a perspective view of the inner bearing member or cone; Fig. 7 is a detail sectional fragmentary view of a modified form of bearing in which the axial connections of the rollers are loose and adapted to serve as idlers separating the balls. In Sheet 2 of the drawings, wherein I have illustrated a modified form of my invention, Figs. 8 to 13 are views corresponding with Figs. 1 to 6, respectively, of Sheet 1, showing a double circular series of balls and a triple circular series of conical rollers of greater length than those shown in Sheet 2, the several parts being arranged and operating substantially as described with reference to the construction shown in Sheet 1, but structurally different to permit the use of a larger number of rollers and balls.

Referring to said drawings, in which the same reference letters are used to denote corresponding parts in different views, the letter A denotes an outer cup-like bearing member or ring having a smooth interior bearing surface which is inclined from its outer to its inner edge or side and within which is placed an inner conical bearing member or cone B, which is inclined or tapered in the same direction as the inner side of the outer bearing member, so as to provide a circular opening between the two rings of greater width at one side than at the other, or converging toward one side of the bearing. The cone B has also annular grooves in its periphery to provide raceways for a plurality of circular series of rollers and balls. As shown in Figs. 4 and 6, it has near each edge or margin an annular groove $b$ and about midway thereof an annular groove $c$, the latter being preferably concave in cross-section to conform to the curvature of a ball, while the marginal grooves $b$, $b$, have preferably flat bottoms with marginal ribs or flanges to receive and guide correspondingly shaped rollers. However, the form of the groove is immaterial and may be varied according to the shape of the ball or roller element used or of any desired shape in cross-section. A circular series of balls C are placed between the rings in the annular groove c, being separated by axial portions or connections d between the rollers D.

The rollers D, D are of conical form, being connected in pairs by axial portions d which are preferably rigid therewith and concave at the center to conform to the curvature of an interposed ball, thus adapting the balls to hug the rollers closely and serve as separators, while the rollers likewise serve as separators for the balls. Such construction in effect comprises a circular series of axes carrying a double or multiple circular series of roller-surfaces, which roller-surfaces may be rigid or integral with their axes, or loose thereon, as hereinafter described. Bands E of metal or other material may encircle the axial portions of the circular series of rollers, between the same and the intermediate series of balls, so that the inner bearing member or cone with the assembled rollers and balls may be kept together when removed from the outer bearing member, as shown in Fig. 5 of the drawings. These bands may consist merely of split rings such as are in common use adapted to be sprung over the rollers and balls and hold the parts together, or solid rings may be employed which, when expanded by heat, may be slipped into place and retained by contraction of the metal in cooling.

It will be observed that the inclined or tapering form of the bearing surfaces of the outer and inner bearing members or rings adapts the rollers and balls to take both radial and end thrust. Either ring may be held stationary and the other revolved, or both rings may revolve in the same or opposite directions, and separation by endwise movement of one relatively to the other can be accomplished only by moving the outer ring in the direction of convergence of the inclined bearing surfaces, or by moving the inner ring in the opposite direction, and any tendency of either ring to move in the reverse direction, the other ring being fixed or stationary, will be resisted by contact of the balls and rollers with the converging bearing surfaces, thus resisting end thrust. I thus provide a very simple, efficient and durable unit-structure ball and roller bearing, in which the pressure or weight is distributed over nearly the entire bearing surface between the rollers and balls, and the balls and rollers are kept apart without the use of "spacers" or other devices for separating either the rollers or balls, which separating devices are usually constructed in separable parts secured together by means of screws that are liable to work loose and drop out, often causing breakage of the bearings, and also producing friction and wear. My improved bearing is also adapted to be used in the same positions and for the same purposes as the ordinary annular ball bearing adapted to sustain radial pressure only, and when similarly placed is adapted to sustain both radial pressure and end thrust. The balls being centrally disposed, take the pressure of the bearing between the rollers, while the rollers take the pressure at each side, though with the construction shown in Figs. 8 to 13 the pressure at the center is on the rollers and at either side thereof the pressure is taken by both rollers and balls arranged in circular series. While the series of balls separating the rollers are designed and adapted to sustain pressure and at the same time serve as a means for separating the rollers, it may be desirable in some cases to use balls of smaller size adapted to serve merely as a means for separating the rollers, in which case the balls would be loosely confined between adjacent pairs of rollers, in contact with their axial connections, which, if rigid, might cause the balls to rotate in a direction opposite to the direction of rotation of the rollers, hence it may be desirable in such cases to provide the rollers with loose axial connections, as shown in Fig. 7, which are adapted to revolve independently of the rollers, such axial portions having the function of idlers, for separating the balls, which in turn separate the rollers.

The tapering bearing members or cup $A^1$ and cone $B^1$, Figs. 8 to 13, have substantially the form of the corresponding parts shown in Figs. 1 to 6, except that the cone has between the marginal grooves for the circular series of rollers at each side, two ball races $c^1$, $c^1$ and an intermediate raceway $c^2$ for a third circular series of rollers $D^2$. In this case, the bands $E^1$ overlie the series of balls and are perforated to permit the balls to protrude through such perforations.

It will be observed that when the axial portions or connections between oppositely disposed rollers are rigid or integral therewith, as preferred, and illustrated in the principal figures of the drawings, one roller of one circular series is an inseparable part of another roller of another series, constituting in effect a single conical roller rotating as one, with spaced portions thereof in contact with the bearing surfaces of the rings and non-contacting intermediate portions, but the conical form is retained whether the contacting portions be considered as separate or independent roller elements, or whether the integral portions be considered as one, either construction being within the spirit and scope of my invention, and the term "conical" as applied to the rollers in this specification including either form.

Various changes in details of construction and arrangement of parts may be made without departing from the spirit and scope of my invention, and I do not desire to be limited to the specific construction shown and described.

Having thus described my invention, what I claim as new and desire to secure by United States Letters Patent is:

1. A unit-structure bearing consisting of concentric rings having bearing surfaces converging toward one side thereof, one ring having a series of annular grooves therein, a circular series of axes between said rings carrying a plurality of circular series of roller surfaces, and a circular series of pressure-sustaining and roller-separating balls between said circular series of roller-surfaces, the roller-surfaces of one series being of larger diameter than those of another series and each series of roller-surfaces and balls being confined in one of said annular grooves.

2. A unit-structure bearing comprising concentric rings having inclined confronting bearing surfaces which converge toward one side of the rings, one of the rings having a series of annular groopes therein, rollers arranged in circular series between said rings, each series running in one of said grooves, and a circular series of balls between said rollers running in an intermediate annular groove and serving as separators for the rollers while the latter serve as separators for the balls.

3. A ball and roller unit-structure bearing comprising concentric rings having inclined bearing surfaces which converge toward one side of the rings, the periphery of the outer ring extending parallel with its axis and at an angle to its interior bearing surface, one of the rings having a plurality of races therein and balls and rollers arranged in circular series between said rings, there being a circular series of rollers at each side of a circular series of balls, the rollers serving as separators for the balls and the balls serving as separators for the rollers.

4. A unit-structure bearing comprising concentric rings whose bearing surfaces are inclined and converge toward one side, the outer ring having a smooth interior bearing surface, and the inner ring having a plurality of exterior annular grooves therein providing a raceway for rollers at each side and an intermediate raceway for balls, together with a circular series of rollers in one of said raceways at each side, and a circular series of balls between said series of rollers, the balls being separated by the rollers and the rollers separated by the balls.

5. In combination, concentric tapering rings, one of which has a series of annular grooves therein providing raceways for rollers and balls, a circular series of axes carrying a plurality of circular series of roller-surfaces running in said raceways between said rings, and a circular series of balls each arranged between and holding apart adjacent pairs of roller-surfaces and adapted to sustain radial pressure and resist end thrust.

6. A unit-structure bearing comprising concentric tapering rings or bearing members, the outer ring having a smooth interior bearing surface, and the inner ring having exterior annular grooves therein, a circular series of rollers between the rings at each side thereof in one of said grooves, and a circular series of balls between said circular series of rollers, the raceways for the rollers having flat bottoms and marginal ribs or flanges, and the raceway for the balls being concave in cross-section; the balls serving as separators for the rollers, and the rollers serving as separators for the balls.

7. A unit-structure bearing consisting of an outer ring or cup having a smooth interior bearing surface tapering toward one side, an inner ring or cone having in its exterior bearing surface a series of annular grooves, the bearing surfaces of the two rings converging toward one side thereof, and a circular series of rollers at each side and an intermediate circular series of balls between said rings running in said grooves and adapted to sustain radial pressure and resist end thrust.

8. A unit-structure bearing comprising outer and inner rings of substantially conical form, one of which has a plurality of annular grooves in its bearing surface, the bearing surfaces of the two rings converging toward one side, a circular series of axes carrying a plurality of circular series of roller-surfaces arranged between said rings, and balls in circular series between said circular series of roller surfaces, said axes and balls serving as separators one for the other and the balls adapted to sustain pressure and resist end thrust.

9. A unit-structure bearing comprising a cup and cone having confronting bearing surfaces which converge toward one side of the rings, the cone having a plurality of exterior annular grooves therein, one groove extending about midway thereof and another along each margin or side, a double circular series of rollers between said rings running in said marginal grooves and having axial portions rigid therewith connecting adjacent pairs, a circular series of balls running in said intermediate groove in contact with said axial portions and serving as separators for the rollers while the latter serve as separators for the balls.

10. A unit-structure bearing comprising concentric rings having confronting bearing surfaces which converge toward one side of the rings, the inner ring having a plurality of exterior annular grooves in its periphery, and the outer ring having a smooth interior bearing surface, rollers of different sizes arranged in circular series between said rings, one series at each side thereof, and a circular series of balls between the circular series of rollers, the balls and rollers each serving as separators one for the other.

11. A bearing composed of cylindrical bearing members, concentrically arranged and having inclined bearing surfaces which converge toward one side thereof, there being a plurality of annular grooves in said surfaces, and a circular series of axes carrying a plurality of circular series of roller-surfaces between said members, together with a circular series of balls between the circular series of roller-surfaces, the roller-surfaces of one series being of larger diameter than those of another series.

In testimony whereof I affix my signature, in presence of two witnesses.

HENRY B. KEIPER.

Witnesses:
CHAS. E. LONG,
C. A. PROST.

---

Correction in Letters Patent No. 997,921.

It is hereby certified that in Letters Patent No. 997,921, granted July 11, 1911 upon the application of Henry B. Keiper, of Lancaster, Pennsylvania, for an improvement in "Antifriction-Bearings," an error appears in the printed specification requiring correction as follows: Page 3, line 25, the word "groopes" should read *grooves;* and that the said Letters Patent should be read with this correction therein that the same may conform to the record of the case in the Patent Office.

Signed and sealed this 5th day of September, A. D., 1911.

[SEAL.]

F. A. TENNANT,
*Acting Commissioner of Patents.* ranged in circular series between said rings, one series at each side thereof, and a circular series of balls between the circular series of rollers, the balls and rollers each serving as separators one for the other.

11. A bearing composed of cylindrical bearing members, concentrically arranged and having inclined bearing surfaces which converge toward one side thereof, there being a plurality of annular grooves in said surfaces, and a circular series of axes carrying a plurality of circular series of roller-surfaces between said members, together with a circular series of balls between the circular series of roller-surfaces, the roller-surfaces of one series being of larger diameter than those of another series.

In testimony whereof I affix my signature, in presence of two witnesses.

HENRY B. KEIPER.

Witnesses:
CHAS. E. LONG,
C. A. PROST.

---

Correction in Letters Patent No. 997,921.

It is hereby certified that in Letters Patent No. 997,921, granted July 11, 1911 upon the application of Henry B. Keiper, of Lancaster, Pennsylvania, for an improvement in "Antifriction-Bearings," an error appears in the printed specification requiring correction as follows: Page 3, line 25, the word "groopes" should read *grooves;* and that the said Letters Patent should be read with this correction therein that the same may conform to the record of the case in the Patent Office.

Signed and sealed this 5th day of September, A. D., 1911.

[SEAL.]

F. A. TENNANT,
*Acting Commissioner of Patents.*

Correction in Letters Patent No. 997,921.

It is hereby certified that in Letters Patent No. 997,921, granted July 11, 1911 upon the application of Henry B. Keiper, of Lancaster, Pennsylvania, for an improvement in "Antifriction-Bearings," an error appears in the printed specification requiring correction as follows: Page 3, line 25, the word "groopes" should read *grooves;* and that the said Letters Patent should be read with this correction therein that the same may conform to the record of the case in the Patent Office.

Signed and sealed this 5th day of September, A. D., 1911.

[SEAL.]

F. A. TENNANT,
*Acting Commissioner of Patents.*